Figure 1:
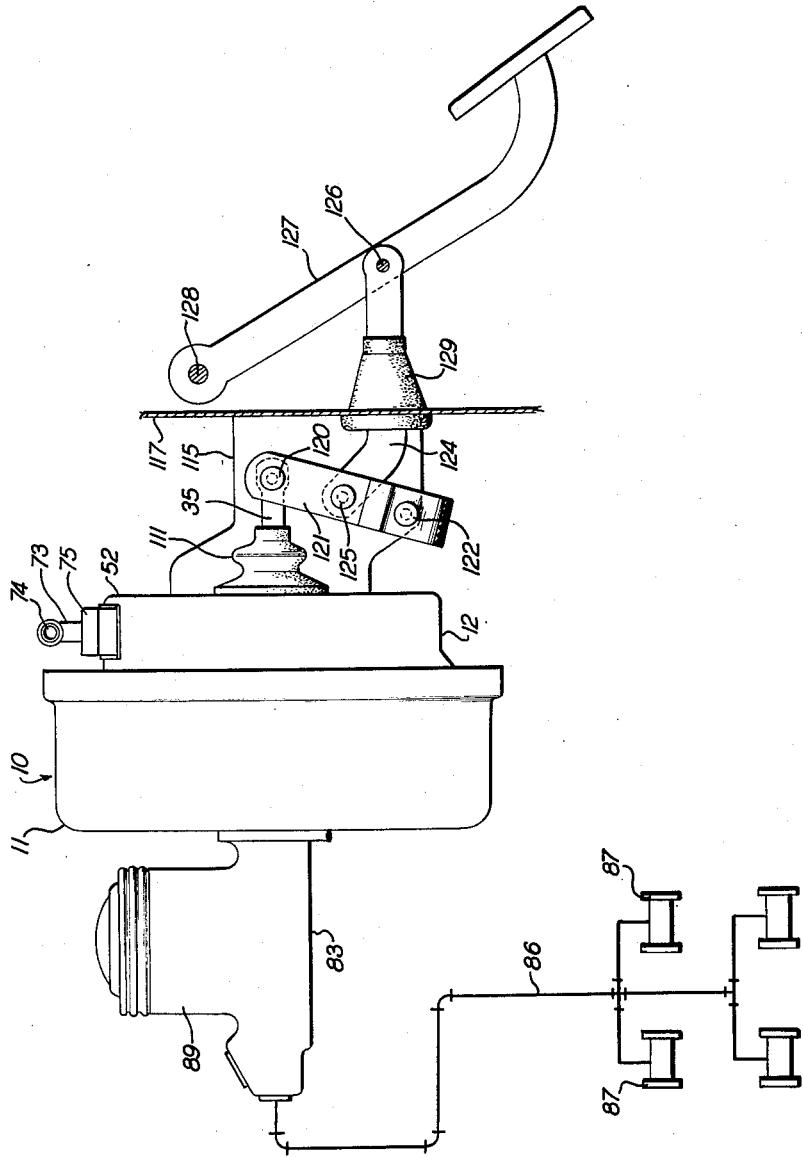

Dec. 12, 1961 L. E. PULKOWNIK 3,012,544
FLUID PRESSURE MOTOR MECHANISM
Filed Nov. 12, 1959 2 Sheets-Sheet 1

INVENTOR
LAWRENCE E. PULKOWNIK

BY John F. Phillips

ATTORNEY

United States Patent Office 3,012,544
Patented Dec. 12, 1961

3,012,544
FLUID PRESSURE MOTOR MECHANISM
Lawrence E. Pulkownik, Allen Park, Mich., assignor to Kelsey-Hayes Company, Detroit, Mich., a corporation of Delaware
Filed Nov. 12, 1959, Ser. No. 852,468
14 Claims. (Cl. 121—41)

This invention relates to a fluid pressure motor mechanism and more particularly to such a mechanism for use as a booster mechanism in connection with vehicle brake systems.

It is now the common practice to provide booster mechanisms of the type just described wherein reaction is transmitted to the vehicle brake pedal to provide the latter with "feel." This ordinarily is accomplished by the use of either of two types of reaction devices, namely, pressure responsive devices sensitive to the degree of energization of the booster motor, and levers subjected to force applied thereto by the brake pedal and by the pressure responsive unit of the motor. Lever mechanisms of this type have been found to be wholly satisfactory in operation, but are somewhat disadvantageous because of additional costs incident to the use of more parts, and to the additional time required in assembly. Pressure responsive reaction devices also have been found to be satisfactory as a whole, but they usually require somewhat complicated porting in the motor pistons for subjecting such devices to differential fluid pressures to react against the brake pedal.

An important object of the present invention is to provide a fluid pressure motor mechanism of the type referred to employing novel pressure responsive means for reacting against the brake pedal without complicated porting of the chambers which affect the reaction device.

A further object is to provide such a mechanism wherein the pressure responsive reaction device is arranged between two chambers, one of which directly communicates with one of the chambers of the motor and the other of which directly communicates with the atmosphere, thus eliminating the porting of the piston to connect the second chamber of the reaction device with the second chamber of the motor.

A further object is to provide a mechanism of the character just referred to wherein the elimination of the porting of the piston for the purpose stated permits the use of the reaction device in a novel way for transmitting pedal forces to the motor piston in later stages of brake operation, for example, after the motor has been energized to its maximum extent.

A further object is to provide novel reaction and valving means which are concentric with the axis of the motor for the accurate delivery of all forces coaxially of the motor to prevent any binding of the parts.

A further object is to provide a novel reaction device which operates in two stages to provide light reaction during initial motor energization, followed by a higher degree of reaction during later stages of operation.

A further object is to provide a novel fluid pressure reaction device in conjunction with a counter-reaction spring which absorbs lighter reaction forces to prevent their transmission to the brake pedal until such forces increase to a predetermined point, for example when the vehicle brake shoes initially engage the drums.

A further object is to provide novel means, operable during later stages of brake operation, for transmitting pedal forces to a portion of the reaction device and then transmitting such forces to the pressure responsive unit of the motor to fully and accurately coaxially deliver pedal forces to the master cylinder plunger to assist the motor in applying the vehicle brakes.

A further object is to provide a motor mechanism of the type referred to which is characterized by the complete lack of any seals between sliding parts except those subject to motor operation, thus eliminating any false "feel" in the valve operating means or reaction means which ordinarily occurs through the use of such seals.

Other objects and advantages of the invention will become apparent during the course of the following description.

Figure 2:
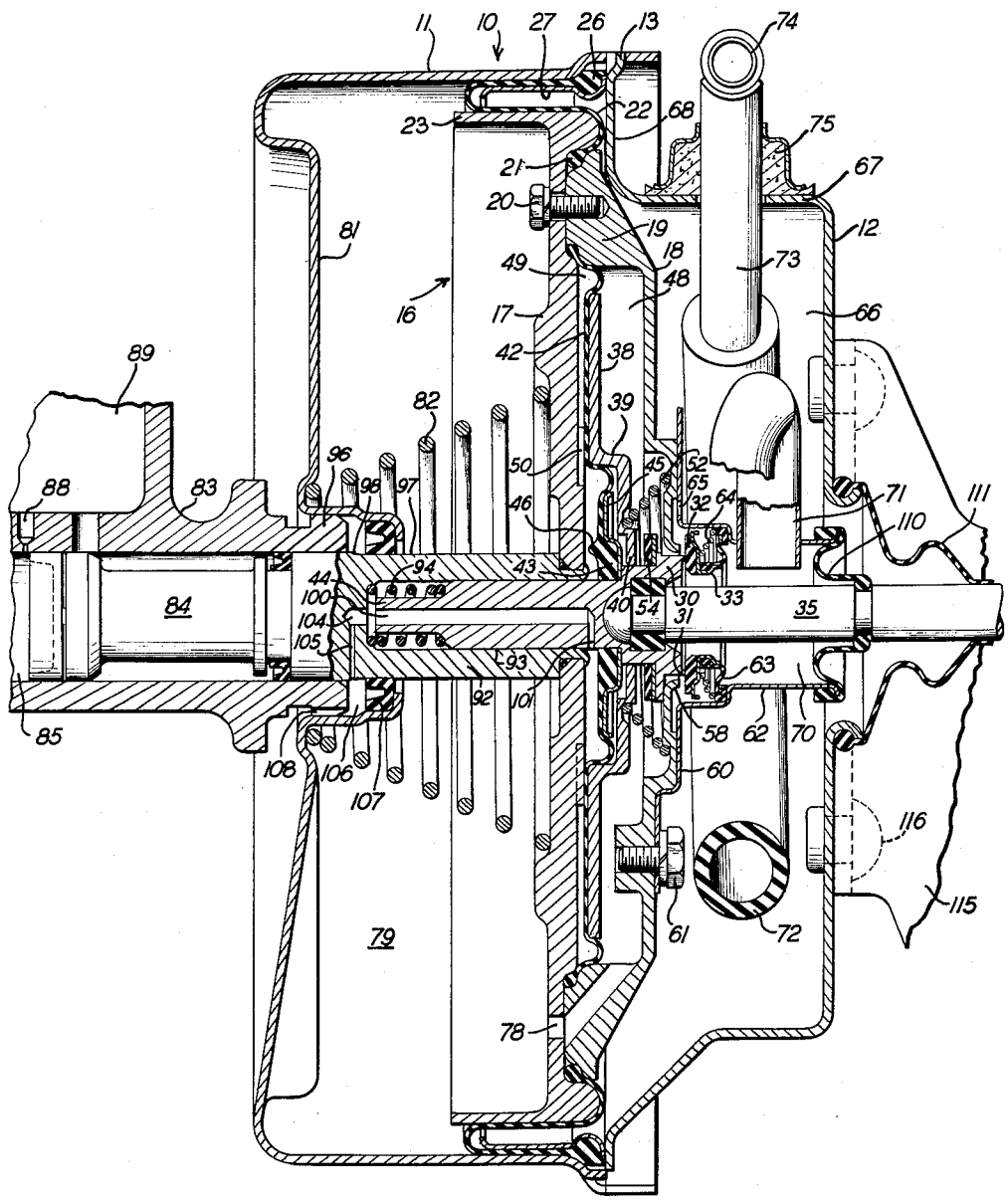

In the drawings I have shown one embodiment of the invention. In this showing:

FIGURE 1 is a side elevation of the motor and associated elements, the wheel cylinders and their connections with the master cylinder being diagrammatically shown; and FIGURE 2 is an enlarged fragmentary axial sectional view through the motor and associated parts, including a portion of the master cylinder.

Referring to the drawings, the numeral 10 designates the fluid pressure motor as a whole comprising a main casing section 11 and a supplemental casing section 12 having adjacent edges connected to each other as at 13 in any suitable manner forming no part of the present invention.

Within the motor is arranged a pressure responsive unit indicated as a whole by the numeral 16 and comprising a pair of bodies 17 and 18, both of which are shown in the present instance as die castings. The body 18 is provided with a relatively deep annular flange 19 to which the body 17 is secured by screws 20. The body 17 serves to secure to the flange 19 the peripheral inner bead 21 of a diaphragm 22 which extends over a cylindrical flange 23 formed integral with the body 17. The diaphragm 22 doubles back upon itself against the inner surface of the casing section 11 and terminates in an outer peripheral bead 26 secured in position by a retaining ring 27. It will become apparent that when the motor is energized and the pressure responsive unit 16 moves to the left of the off position shown in FIGURE 2, the diaphragm rolls over the flange 23.

Coaxially within the motor is arranged a manually operable member 30 the right-hand end of which, as viewed in FIGURE 2, is provided with an annular valve seat 31. This seat normally engages a valve element 32 supported by a ring member 33, further referred to below. The manually operable member 30 is axially movable to the left from its normal off position by a push rod 35 movable by the vehicle brake pedal in a manner to be described.

Radially inwardly of the flange 19 is arrange a plate 38 having its radially inner portion offset as at 39 to the right in FIGURE 2. An axial opening through the center of the plate 38 surrounds the adjacent portion of the manually operable member 30 in freely slidable relation therewith. Adjacent such opening, the plate is provided with a wall portion 40 perpendicular to the axis of the motor.

A diaphragm 42 has its outer periphery clamped between the flange 19 and body 17 and has at its inner periphery a relatively heavy bead 43 surrounding a reduced axial extension 44 preferably formed integral with the manually operable member 30. The shoulder occurring between the body of the member 30 and axial extension 44 engages a backing plate 45 shaped to fit against the adjacent face portion of the diaphragm 42. The opposite face of such portion of the diaphragm 42 is provided with circumferentially spaced projecting bosses 46 spaced from the adjacent face of the member 17 when the parts are in the normal off positions shown.

The plate 38 and diaphragm 42 form a pressure responsive reaction device, and such device divides the space between the bodies 17 and 18, inwardly of the flange 19, to form a pair of chambers 48 and 49. The radially inner and outer portions of the chamber 49 communicate through radial grooves 50 formed in the body 17. The right-hand face of the body 17 as viewed in FIGURE 2, between the grooves 50, is engaged by the adjacent portion of the diaphragm 42 to limit movement of the reaction device toward the left in FIGURE 2. The reaction device has been shown in FIGURE 2 at such limit of movement, and it is biased to such position by a spring 52 arranged between the inner portion of the plate 38 and the body 18. The wall portion 40 of the plate 38 is normally spaced from a cushion 54 surrounding the manually operable member 30 and in solid engagement with a shoulder thereon for a purpose to be described.

The inner periphery of the body 18 is turned to form an annular valve seat 58 concentric with and surrounding the valve seat 31 and normally spaced from the valve 32.

A shell 60 is secured as at 61 to the body 18 and is provided with an axially extending portion 62 carrying a diaphragm 63 to which the member 33 is secured. The latter member is biased to the left in FIGURE 2 together with the valve 32 by a spring 64. The shell 60 is apertured as at 65 to provide fixed communication between the chamber 48 and a chamber 66 formed within the casing section 12. Such casing section includes a cylindrical concentric wall 67 and radial wall portions 68, the latter of which engage with a portion of the diaphragm 22 to limit and silence movement of the pressure responsive unit 16 to its off position.

The cylindrical portion 62 of the shell 60 forms therewithin a vacuum chamber 70 communicating through an elbow 71 with a pigtail pipe 72 leading to another elbow 73 which projects through the cylindrical casing wall 67 and is connected to a pipe 74 leading to a source of vacuum. The chamber 66 is an atmospheric chamber and is supplied with air through an air cleaner 75 surrounding the elbow 73 and fixed in any suitable manner to the casing section 12.

Atmospheric pressure is always present in the chamber 66 and such pressure, in the off positions of the parts, is communicated through ports 65 to the reaction chamber 48 which, in turn, communicates through a passage 78 with a variable pressure motor chamber 79 formed in the casing section 11. Obviously, the chamber 66 is the constant pressure chamber of the motor and the motor is operated by exhausting air from the chamber 77 as described below.

The casing section 11 is provided with an end wall 81. A return spring 82 is arranged between the end wall 81 and the body 17 to bias the pressure responsive unit to its off position. To the end wall 81 is secured, in any suitable manner, a conventional master cylinder 83 having therein a plunger 84 movable to displace fluid from a chamber 85 through brake lines 86 (FIGURE 1) to the vehicle wheel cylinders 87. Fluid is supplied to the chamber 85 in the usual way through a port 88 communicating with a reservoir 89.

The plunger 84 is provided with an axial extension 92 secured at its inner end to the body 17 and provided with an axial bore 93 in which the extension 44 is slidable. Such extension, together with the manually operable member 30, is biased to off position by a spring 94.

The body of the plunger 84 is slidable through a bearing 96 fixed with respect to the casing section 11. The diameter of the extension 92, inwardly of the bearing 96 when the parts are in off position, is slightly reduced as at 97, there being a small shoulder 98 between such portions of the plunger 84. It will be apparent, therefore, that when the plunger 84 moves to the left, there will be a space between the bearing 96 and the plunger portion 97. The purpose of this construction will become apparent.

The projection 44 is provided with an axial passage 100 communicating at its right-hand end (FIGURE 2) with a lateral passage 101 leading into the reaction chamber 49. The passage 100 communicates at its left-hand end (FIGURE 2) with a short axial passage 104 formed in the plunger 84 and communicating with the lateral passage 105 leading to a space 106 between the bearing 96 and a seal 107 through which slides the plunger portion 97. The bearing 96 is externally grooved as at 108 to connect the space 106 to the atmosphere. Accordingly, it will be apparent that the reaction chamber 49 is in fixed communication with the atmosphere without the porting of the pressure responsive unit to connect the chamber 49 to the motor chamber 66.

The push rod 35 is connected to the right-hand end of the shell 62 (FIGURE 2) by a boot or diaphragm 110 which seals the vacuum chamber 70 from the atmosphere. The rod 35 is sealed with respect to the casing section 12 by a conventional boot 111.

Referring to FIGURE 1, the push rod 35 extends between side mounting brackets 115 secured to the casing section 12 as at 116 (FIGURE 2), such brackets serving to support the present mechanism with respect to the fire wall 117 of the motor vehicle. The rod 35 is pivoted as at 120 to a lever 121 pivotally supported as at 122 between the brackets 115. A link 124 is pivoted at one end as at 125 to the lever 121 and has its opposite end pivoted as at 126 to a conventional depending brake lever 127 mounted to turn on a fixed pivot 128. A boot 129 is preferably connected between the link 124 and the fire wall 117.

*Operation*

The parts of the mechanism normally occupy the positions shown in FIGURES 1 and 2. The valve 32 is in normal engagement with the seat 31, and accordingly the vacuum chamber 70 is cut off from the motor chamber 79. The cushion 54 will be in spaced relation to the wall 40 of the plate 38, the latter being, in its extreme left-hand position in FIGURE 2, in engagement with the face of the body 17 between the slots 50. The reaction device is held in such position by the spring 52. The seat 58, being spaced from the valve 32, opens the motor chamber 66 through openings 65 to the reaction chamber 48, which is always in communication with the motor chamber 79 through passage 78. Accordingly, atmospheric pressure will be present in both motor chambers 66 and 79.

The mechanism is operated by depressing the pedal 127 to transmit movement through the lever 121 to the push rod 35 to move the manually operable member 30 to the left in FIGURE 2. Such operation takes place solely against the loading of the relatively light spring 94, thus providing the device with a "soft" initial pedal. After relatively slight movement of the member 30, the valve 32, being caused to follow movement of the valve seat 31 by the spring 64, will be brought into engagement with the valve seat 58 and the valve parts will now be in lap position. Such position is reached prior to engagement of the cushion 54 with the wall portion 40. Sufficient space is left between such elements for slight further operation of the member 30 to energize the motor as described below. Approximately at the lap position of the parts bosses 46 engage the adjacent face of the body 17. The diaphragm 42 and consequently the bosses 46 being formed of soft material, movement of the valve parts beyond the lap position is not substantially resisted by engagement of the bosses 46 with the body 17. Such engagement tends to stabilize the operation of the valve mechanism.

Slight further movement of the member 30 beyond the lap position of the valve parts cracks the valve seat 31 from the valve 32, the latter engaging the valve seat 58. At such position, atmospheric pressure in the motor chamber 66 will be cut off from the chamber 48 and the latter will be opened to the vacuum chamber 70 to evacuate the motor chamber 79. The pressure responsive unit 16 accordingly starts to move to the left in FIGURE 2. Such movement effects similar movement of the plunger 84 to displace fluid from the master cylinder chamber 85 into the brake lines 86 and thus into the wheel cylinders 87.

Atomspheric pressure is always present in the chamber 49 as previously described, while pressure in the chamber 48 will always duplicate pressure in the chamber 79. Accordingly, the same differential pressures which move the pressure responsive unit 16 to the left in FIGURE 2 will tend to move the reaction device comprising plate 38 and diaphragm 42 to the right. Such movement of the plate 38 is prevented during initial operation of the motor by the loading of the counter-reaction spring 52. Therefore, if the unit 16 moves to the left, a slight gap will be initially maintained between the cushion 54 and plate portion 40. However, as soon as differential pressures are initially built up in the chambers 48 and 49 upon the cracking of the valve 32, the portion of the diaphragm 42 inwardly of the shoulder 39, being movable independently of the plate 38, will lightly oppose movement of the manually operable member 30, thus providing an initial stage of reaction which is proportional to the initial degree of energization of the motor. Approximately at the point where the brake shoes engage the drums, resistance to movement of the plunger 84 will increase, thus causing a drop in pressure in the chamber 79. This obviously causes a corresponding increase in the differential pressures between the chambers 48 and 49. As such point, the loading of the spring 52 will be overcome and the plate portion 40 will engage the cushion 54 to resist valve operating movement of the member 30 and rod 35, thus transmitting a second stage of reaction to the brake pedal to provide the latter with "feel." This will be proportional to the degree of energization of the motor.

It will be apparent that when the spring 52 is overcome to close the gap between the cushion 54 and wall portion 40, the diaphragm 42 will be moved slightly out of engagement with the body 17. When the motor reaches or approaches the point of maximum energization, increased force applied to the brake pedal will transmit force from the member 30 through cushion 54 to the wall portion 40, and the diaphragm will be moved back into firm engagement with the inner face of the body 17. Under such conditions, pedal forces will be directly applied in an accurate coaxial manner to the body 17 to assist the motor in generating pressure in the master cylinder chamber 85. Thus any maximum pressure may be generated in the chamber 85, depending upon the ability of the operator to apply force to the brake pedal.

When the pedal is released, the spring 94 will promptly move the member 30 to the right in FIGURE 2 to engage the valve seat 31 with the valve 32 and move the latter against its light spring 64 out of engagement with the valve seat 58. The chamber 48 and motor chamber 79 will now be disconnected from the source of vacuum and again connected to the atmospheric chamber 66 to rapidly balance pressures in the motor chambers. The return spring 82 then moves the pressure responsive unit to its normal off position, such movement being silenced by engagement with the wall portion 68 of the adjacent portion of the diaphragm 22.

From the foregoing it will be apparent that all of the operating parts of the present mechanism are coaxial. The arrangement is such as to accurately coaxially deliver pedal forces from the rod 35 to the pressure responsive unit when the motor is substantially fully energized. The reaction device can be simply formed and arranged, as shown, because of the lack of any necessity to port the pressure responsive unit to connect the atmospheric chambers 49 and 66. Such communication could be only awkwardly accomplished. The shape and arrangement of parts is such that the assembly of the elements is very easily carried out. For example, the plate 38 and diaphragm 42 may be assembled around the member 30 together with the cushion 54, whereupon the spring 52 is placed in position, followed by the placing and fixing of the body 18 in position. This is followed by the securing of the shell 60, with the valve device therein, against the body 18 by the screws 61. Throughout operation of the device, the passage 105 will be maintained in communication with the atmosphere due to the reducing of the diameter of the plunger 84 as at 97, there always being clearance between such portion of the plunger and the bearing 96. The slight movement of the extension 44 relative to the plunger portion 97 prevents communication from ever being cut off between the passage 101 and the chamber 48.

The accurate delivery of all forces coaxially of the motor greatly smooths out the operation of the device. The engagement of the plate portion 40 with the cushion 54 occurs silently. There are no seals or any other means offering a variable resistance to movement of the reaction means with respect to the member 30, hence reaction is always accurately delivered. Since both ends of the bore 93 are open to the atmosphere, it is unnecessary to provide any seals around the axial extension 44. As a matter of fact, the entire motor in itself is completely lacking in seals surrounding any sliding parts, the only seals which are used being those subject to having their friction overcome by motor forces, namely the seal 107 and the conventional seals surrounding the plunger 84. Motor operation accordingly is particularly smooth, and reaction forces are always accurately delivered to the brake pedal.

It is to be understood that the form of the invention shown and described is to be taken as a preferred example of the same and that various changes in the shape, size, and arrangement of the parts may be made as do not depart from the spirit of the invention or the scope of the appended claims.

I claim:
1. A fluid pressure motor mechanism comprising a casing, a pressure responsive unit therein dividing said casing to form an atmospheric chamber in one end and a variable pressure chamber in the other end thereof, said pressure responsive unit having a space therein, a pressure responsive reaction device in said space dividing it to form a pair of reaction chambers one of which toward said one end of said casing communicates with said variable pressure chamber, a device to be operated connected to said pressure responsive unit and projecting therefrom through said casing and provided with passage means connecting the other reaction chamber to the atmosphere externally of said casing, a valve mechanism normally connecting said atmospheric and variable pressure chambers to each other and comprising a manually movable member for operating said valve mechanism to disconnect such chambers from each other and to connect said variable pressure chamber to a source of vacuum, said reaction device being engageable with said manually operable member to oppose movement thereof from a normal off position when said manually operable member is moved.

2. A fluid pressure motor mechanism comprising a casing, a pressure responsive unit therein dividing said casing to form an atmospheric chamber in one end and a variable pressure chamber in the other end thereof, said pressure responsive unit having a space therein, a pressure responsive reaction device in said space dividing it to form a pair of reaction chambers one of which toward said one end of said casing communicates with said variable pressure chamber, a device to be operated connected to said pressure responsive unit and projecting therefrom through said casing and provided with passage means connecting the other reaction chamber to the atmosphere externally of said casing, a valve mechanism normally connecting said atmospheric and variable pressure chambers to each other and comprising a manually movable member for operating said valve mechanism to disconnect such chambers from each other and to connect said variable pressure chamber to a source of vacuum, said pressure responsive device including a radially inner portion having a normal position in spaced relation to said manually operable member, and a spring biasing said portion of said reaction device to its normal position whereby, when pressure in said one reaction chamber has been reduced to a predetermined point below atmospheric pressure, said space will be taken up and said portion of said reaction device will oppose valve operating movement of said manually operable member.

3. A motor mechanism according to claim 2 wherein said reaction device has a second radially inner portion separate from said first-named portion and movable independently thereof, said second portion being in constant engagement with said manually operable member to react against movement of said manually operable member upon initial reduction of pressure in said one reaction chamber upon operation of said manually operable member.

4. A fluid pressure motor mechanism comprising a casing, a pressure responsive unit in said casing dividing it to form an atmospheric chamber in one end and a variable pressure chamber in the other end, said pressure responsive unit having a space therein, a reaction device in said space dividing it to form a pair of reaction chambers one of which is arranged toward said one end of said casing and is in fixed communication with said variable pressure chamber and the other of which is open to atmospheric pressure, and a valve mechanism normally connecting said atmospheric and variable pressure chambers to each other and comprising a manually operable member having a normal position from which it is movable to disconnect such chambers from each other and connect said variable pressure chamber to a source of vacuum, said reaction device comprising a rigid member having a radially inner portion which has lost motion connection with said manually operable member when said rigid member is in a normal position, a spring biasing said rigid member to said normal position, and a diaphragm forming a portion of the area of said reaction device exposed to pressure in said other reaction chamber and engaged with said manually operable member to oppose valve operating movement thereof when a pressure drop occurs in said one reaction chamber, said spring being overcome upon a further drop in pressure in said one reaction chamber to take up said lost motion to provide a second stage of reaction opposing movement of said manually operable member.

5. A fluid pressure motor mechanism comprising a casing, a pressure responsive unit in said casing dividing it to form an atmospheric chamber in one end and a variable pressure chamber in the other end, said pressure responsive unit having a space therein, a reaction device in said space dividing it to form a pair of reaction chambers one of which is arranged toward said one end of said casing and is in fixed communication with said variable pressure chamber and the other of which is open to atmospheric pressure, and a valve mechanism normally connecting said atmospheric and variable pressure chambers to each other and comprising a manually operable member having a normal position from which it is movable to disconnect such chambers from each other and connect said variable pressure chamber to a source of vacuum, said reaction device comprising a plate and a diaphragm sealed at its outer periphery to said pressure responsive unit and at its inner periphery to said manually operable member, said diaphragm having a radially inner portion representing a fraction of its area exposed to pressure in said other reaction chamber and movable independently of said plate whereby, upon a drop in pressure in said one reaction chamber, said radially inner portion of said diaphragm will oppose valve operating movement of said manually operable member, the radially inner portion of said plate having lost motion connection with said manually operable member and having its outer portion bearing against said diaphragm and holding the latter in a normal position against the face of said other reaction chamber toward said other end of said casing, and a spring biasing said reaction device to said normal position whereby, upon the building up of predetermined differential pressures in said reaction chambers, said lost motion connection will be taken up and said plate will oppose valve operating movement of said manually operable member in a second stage of reaction.

6. A fluid pressure motor mechanism comprising a casing, a pressure responsive unit in said casing dividing it to form an atmospheric chamber in one end and a variable pressure chamber in the other end, said pressure responsive unit having a space therein, a reaction device in said space dividing it to form a pair of reaction chambers one of which is arranged toward said one end of said casing, and the other of which is in fixed communication with said variable pressure chamber, a device to be operated connected to said pressure responsive unit, and a valve mechanism normally connecting said atmospheric and variable pressure chambers to each other and comprising a manually operable member having a normal position from which it is movable to disconnect such chambers from each other and connect said variable pressure chamber to a source of vacuum, said device to be operated and said manually operable member having passages connecting said other reaction chamber to the atmosphere, said reaction device having a radially inner portion engageable with said manually operable member to transmit force thereto opposing valve operating movement thereof when said one reaction chamber is connected to the source of vacuum.

7. A mechanism according to claim 6 wherein said reaction device is provided with a second radially inner portion normally in a position providing lost motion connection with said manually operable member, and a spring biasing said second radially inner portion to said normal position whereby, when predetermined differential pressure exist in said reaction chambers, said spring will be overcome and said lost motion connection will be taken up to transmit reaction forces from said second radially inner portion to said manually operable member.

8. A fluid pressure motor mechanism comprising a casing, a pressure responsive unit therein dividing said casing to form an atmospheric chamber in one end and a variable pressure chamber in the other end thereof, a bearing in said other end of said casing, a member to be operated connected with said pressure responsive unit and having a portion fitting and sliding in said bearing, there being a space adjacent said bearing communicating with the atmosphere, said member to be operated between said bearing and said pressure responsive unit having a portion reduced in diameter whereby, when said pressure responsive unit is moved, a space will be provided around such portion of said member to be operated within said bearing communicating with said first-named space, said pressure responsive unit having a space therein, a reaction device in said last-named space dividing it to form a pair of reaction chambers one of which toward said one end of said casing communicates with said variable pressure chamber, a valve mechanism normally connecting said atmospheric and variable pressure chambers to each other and comprising a manually movable member operable to disconnect such chambers from each other and connect said variable pressure chamber to a source of vacuum, said manually operable member and said member to be operated having passages communicating between the other reaction chamber and said first-named space, said reaction device having a portion engageable with said manually operable member to react against valve operating movement thereof when pressure is reduced in said one reaction chamber.

9. A mechanism according to claim 8 wherein said reaction device is provided with a second portion having a normal position in which it has lost motion connection with said manually operable member, and a spring biasing said second portion to said normal position whereby, when pressure in said one reaction chamber is reduced to a predetermined point, said spring will be overcome and said second radially inner portion will engage and oppose movement of said manually operable member.

10. A fluid pressure motor mechanism comprising a casing having a pressure responsive unit dividing it to form an atmospheric chamber in one end and a variable pressure chamber in the other end of said casing, a valve mechanism coaxially of said pressure responsive unit normally connecting said chambers and having a manually operable member movable from a normal position to disconnect said chambers and connect said variable pressure chamber to a source of vacuum, a bearing in said other end of said casing, a member to be operated connected at one end to said pressure responsive unit fitting and sliding in said bearing, said member to be operated having a portion between said bearing and said pressure responsive unit reduced in diameter to provide a space therearound within said bearing when said pressure responsive unit is moved from a normal off position, said other end of said casing adjacent said bearing being provided with an atmospheric space communicating with said first-named space, said pressure responsive unit having a space therein, a reaction device in said last-named space dividing it to form a pair of reaction chambers one of which toward said one end of said casing communicates with said variable pressure chamber, said manually operable member having an axial projection slidable in said member to be operated, said member to be operated and said axial projection having passage means connecting the other reaction chamber to said atmospheric space, said reaction device having a radially inner portion engaging said manually operable member to oppose valve operating movement thereof upon a drop in pressure in said one reaction chamber.

11. A mechanism according to claim 10 wherein said manually operable member has a shoulder against which said radially inner portion of said reaction device seats, said reaction device being provided with a second radially inner portion having a normal position in which it has lost motion connection with said manually operable member, and resilient means biasing said second radially inner portion to said normal position, whereby, upon a predetermined drop in pressure in said one reaction chamber, said resilient means will be overcome and said lost motion connection will be taken up whereby said second radially inner portion will oppose movement of said manually operable member.

12. A mechanism according to claim 10 wherein said reaction device comprises a diaphragm having an outer periphery fixed to said pressure responsive unit and an inner periphery sealed with respect to said manually operable member and forming said radially inner portion of said reaction device, said reaction device further comprising a plate having a normal position and provided with a radially inner flange having lost motion connection with a portion of said manually operable member, and a spring biasing said plate to said normal position whereby, upon a predetermined drop in pressure in said one reaction chamber, said spring will be overcome and said lost motion connection will be taken up and said flange will oppose valve operating movement of said manually operable member.

13. A fluid pressure motor mechanism comprising a casing, a pressure responsive unit in said casing dividing it to form an atmospheric chamber in one end and a variable pressure chamber in the other end thereof, said pressure responsive unit comprising a first body provided with a radially outer cylindrical flange and a second body provided with a flange secured to said first body, a rolling diaphragm having a radially inner bead secured between said first body and the flange of said second body, said diaphragm extending over said cylindrical flange and having its outer periphery sealed to said casing, said second body within said flange forming with said first body a space, a valve mechanism coaxially of said bodies having a normal position connecting said chambers to each other and comprising a manually operable member movable to disconnect said chambers from each other and connect said variable pressure chamber to a source of vacuum, a reaction device in said space dividing it to form a pair of reaction chambers one of which toward said one end of said casing communicates with said variable pressure chamber and the other of which communicates with the atmosphere, said reaction device comprising a reaction diaphragm the outer periphery of which is clamped between said first body and the flange of said second body and the inner periphery of which is directly sealed to said manually operable member whereby, upon a drop in pressure in said one reaction chamber, said reaction diaphragm will oppose valve operating movement of said manually operable member.

14. A mechanism according to claim 13 wherein said reaction device further comprises a plate the radially outer portion of which engages said reaction diaphragm and normally holds said reaction diaphragm against said first body, the radially inner portion of said plate and the radially inner portion of said reaction diaphragm being axially relatively movable, said radially inner portion of said plate having lost motion connection with said manually operable member, and a spring biasing said plate to normal position whereby, when pressure in said one reaction chamber drops to a predetermined point, said lost motion connection will be taken up and said radially inner portion of said plate will oppose valve operating movement of said manually operable member.

References Cited in the file of this patent
UNITED STATES PATENTS

| | | |
|---|---|---|
| 2,818,710 | Price | Jan. 7, 1958 |
| 2,822,782 | Hupp | Feb. 11, 1958 |
| 2,842,101 | Price | July 8, 1958 |
| 2,861,427 | Whitten | Nov. 25, 1958 |
| 2,876,627 | Ayers | Mar. 10, 1959 |
| 2,880,704 | Price | Apr. 7, 1959 |